United States Patent
Rosko et al.

(10) Patent No.: US 9,243,390 B2
(45) Date of Patent: Jan. 26, 2016

(54) CAPACITIVE SENSING FAUCET INCLUDING A CONDUCTIVE POLYMER

(71) Applicant: Masco Corporation of Indiana, Indianapolis, IN (US)

(72) Inventors: Michael Scot Rosko, Greenwood, IN (US); Joel D. Sawaski, Indianapolis, IN (US); Alfred C. Nelson, Westfield, IN (US)

(73) Assignee: Delta Faucet Company, Indianapolis, IN (US)

( * ) Notice: Subject to any disclaimer, the term of this patent is extended or adjusted under 35 U.S.C. 154(b) by 146 days.

(21) Appl. No.: 14/199,267

(22) Filed: Mar. 6, 2014

(65) Prior Publication Data

US 2014/0261750 A1 Sep. 18, 2014

Related U.S. Application Data

(60) Provisional application No. 61/786,210, filed on Mar. 14, 2013.

(51) Int. Cl.
*E03C 1/05* (2006.01)
*F16K 21/00* (2006.01)

(52) U.S. Cl.
CPC .............. *E03C 1/055* (2013.01); *F16K 21/00* (2013.01); *E03C 1/057* (2013.01); *Y10T 137/1842* (2015.04); *Y10T 137/9464* (2015.04)

(58) Field of Classification Search
CPC .......... E03C 1/055; E03C 1/05; E03C 1/057; F16K 21/00; F16K 19/006; F16K 31/02; Y10T 137/1842; Y10T 137/9464; E03D 5/105

USPC .................. 137/78.1, 801; 251/129.04; 4/623
See application file for complete search history.

(56) References Cited

U.S. PATENT DOCUMENTS

| | | | |
|---|---|---|---|
| 4,766,389 A | 8/1988 | Rhoades et al. | |
| 6,340,032 B1 | 1/2002 | Zosimadis | |
| 6,693,441 B2 | 2/2004 | Lane et al. | |
| 6,819,316 B2 | 11/2004 | Schulz et al. | |
| 6,962,168 B2 * | 11/2005 | McDaniel | E03C 1/055 137/801 |
| 7,116,117 B2 | 10/2006 | Nakano et al. | |
| 7,215,529 B2 | 5/2007 | Rosenau | |
| 7,474,296 B2 | 1/2009 | Obermeyer et al. | |
| 7,690,395 B2 | 4/2010 | Jonte et al. | |
| 8,127,782 B2 | 3/2012 | Jonte et al. | |
| 2006/0130907 A1 * | 6/2006 | Marty | E03C 1/057 137/613 |
| 2008/0196945 A1 | 8/2008 | Konstas | |

(Continued)

FOREIGN PATENT DOCUMENTS

| WO | WO 2006/065514 | 6/2006 |
|---|---|---|
| WO | WO 2008/001220 | 1/2008 |
| WO | WO 2008/088534 | 7/2008 |

*Primary Examiner* — Kevin Lee
*Assistant Examiner* — Michael R Reid
(74) *Attorney, Agent, or Firm* — Faegre Baker Daniels LLP

(57) ABSTRACT

A capacitive sensing faucet is provided. In one exemplary embodiment, the faucet includes a a faucet body hub; a spout coupled to the faucet body hub; an insulator defining a capacitive coupling between the faucet body hub and the spout, wherein the insulator is formed from an electrically conductive polymer; a capacitive sensor having an electrode coupled to the faucet body hub; and a controller coupled to the capacitive sensor, the controller determining if the spout is touched by a user based on an output signal from the capacitive sensor.

30 Claims, 10 Drawing Sheets

(56) References Cited

U.S. PATENT DOCUMENTS

| | | |
|---|---|---|
| 2009/0009491 A1 | 1/2009 | Grivna |
| 2009/0033341 A1 | 2/2009 | Son et al. |
| 2010/0044604 A1 | 2/2010 | Burke et al. |
| 2010/0079153 A1 | 4/2010 | Maloof et al. |
| 2010/0096017 A1 | 4/2010 | Jonte et al. |
| 2010/0108165 A1 | 5/2010 | Rodenbeck et al. |
| 2010/0170570 A1 | 7/2010 | Rodenbeck et al. |
| 2012/0160349 A1 | 6/2012 | Jonte et al. |
| 2013/0146160 A1 | 6/2013 | Davidson et al. |

\* cited by examiner

CAPACITIVE SENSING FAUCET INCLUDING A CONDUCTIVE POLYMER

CROSS-REFERENCE TO RELATED APPLICATIONS

This application claims priority to U.S. Provisional Patent Application Ser. No. 61/786,210, entitled CAPACITIVE SENSING FAUCET INCLUDING A CONDUCTIVE POLYMER, filed Mar. 14, 2013, the disclosure of which is expressly incorporated by reference herein in its entirety.

BACKGROUND AND SUMMARY OF THE INVENTION

The present disclosure relates generally to an apparatus and method for a capacitive sensing electronic faucet. More particularly, the present disclosure relates to an apparatus and method for a capacitive sensing electronic faucet including an electrically conductive polymer.

Automatic and electronic faucets (hereinafter referred to as electronic faucets), such as those including capacitive control or sensing features, are becoming increasingly popular, particularly in residential households. Exemplary electronic faucets and isolating bases are disclosed in U.S. Patent Application Publication No. 2010/0108165, published May 6, 2010, entitled "Capacitive Sensing Apparatus and Method for Faucets," U.S. Patent Application Publication No. 2010/0170570, published Jul. 8, 2010, entitled "Capacitive Coupling Arrangement for a Faucet," U.S. Patent Application Publication No. 2012/0160349, published Jun. 24, 2012, entitled "Multi-Mode Hands Free Automatic Faucet," U.S. patent application Ser. No. 13/752,722, filed Feb. 4, 2013 and entitled "Capacitive User Interface," U.S. Pat. No. 7,690,395, issued Apr. 6, 2010 and entitled, "Multi-Mode Hands Free Automatic Faucet," U.S. Pat. No. 8,127,782, issued Mar. 6, 2012 and entitled, "Multi-Mode Hands Free Automatic Faucet," and U.S. Patent Application Publication No. 2010/0096017, published Apr. 22, 2010 and entitled, "Multi-Mode Hands Free Automatic Faucet," the disclosures of each of which are hereby incorporated by reference.

In an illustrative embodiment, a faucet includes a touch sensor in a spout of the faucet, and another touch sensor in a manual valve handle. In the illustrative embodiment, the faucet distinguishes between a user touching the handle and a user touching the spout. In the illustrative embodiment, the faucet may have different flow rates and/or temperatures associated with a user touching the handle and a user touching the spout. The faucet therefore provides an easy and convenient way to turn the water off and on without having to adjust the water flow rate and temperature.

In a typical system, the hub may include a metallic portion which extends into an insulator separating the hub and spout such that a metallic portion of the hub overlaps a portion of the metal spout. The amount of overlap of metal between the hub and the spout affects the signal amplitude of the output signal. It is desirable achieve a desired signal amplitude without adjusting the overlap of metal between the hub and the spout.

In one illustrative embodiment, a capacitive sensing faucet is provided. The faucet includes a faucet body hub; a spout coupled to the faucet body hub; an insulator defining a capacitive coupling between the faucet body hub and the spout, wherein the insulator is formed from an electrically conductive polymer; a capacitive sensor having an electrode coupled to the faucet body hub; and a controller coupled to the capacitive sensor, the controller determining if the spout is touched by a user based on an output signal from the capacitive sensor.

In another illustrative embodiment, a faucet is provided. The faucet includes a faucet body hub; a manual valve supported by the hub, the valve including a movable valve stem; a manual valve handle movably supported by the hub and operably coupled to the valve stem to control the manual valve, the manual valve handle including a user input member; a spout supported by the hub; and a capacitive coupling defined by an insulator positioned intermediate the hub and one of the spout and the handle, wherein the insulator is formed from an electrically conductive polymer.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
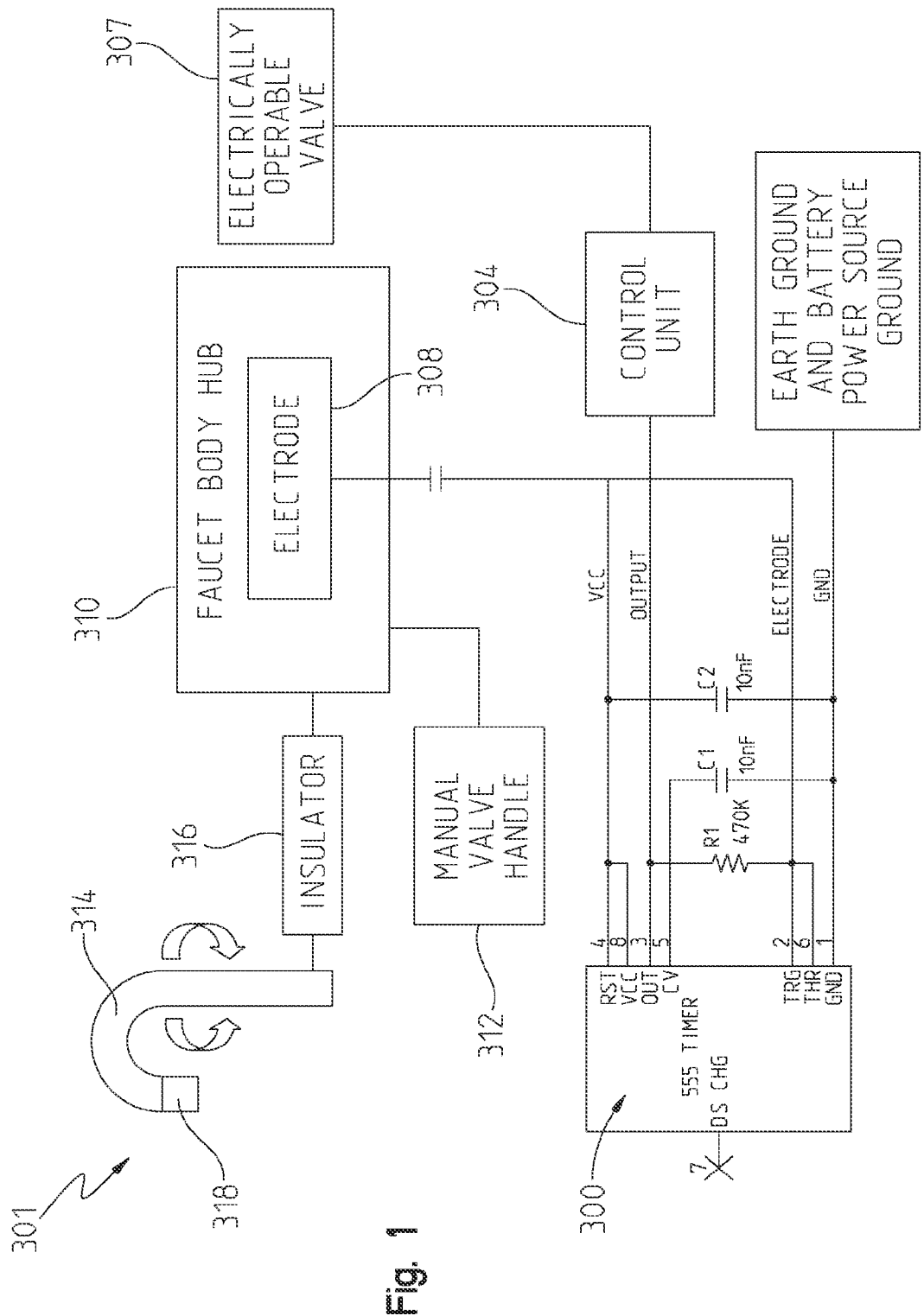
FIG. 1 is a block diagram with schematic portions illustrating a single hole mount faucet including a capacitive sensor.

The embodiments of the invention described herein are not intended to be exhaustive or to limit the invention to precise forms disclosed. Rather, the embodiments selected for description have been chosen to enable one skilled in the art to practice the invention.

Corresponding reference characters indicate corresponding parts throughout the several views. Although illustratively used to electrically isolate a faucet base and mounting deck, a base ring according to the present disclosure may also be used to electrically isolate other fluid delivery devices, including pulldown wands, faucet spray heads, hoses, fluid conduits, pullout wands, fluid tubes, side sprayers, and faucet spouts.

An exemplary single hole mount faucet 301 having a capacitive sensor 300 is illustrated in FIG. 1. In the illustrated embodiment, an oscillator integrated circuit such as, for example, a 555 timer is used as the capacitive sensor 300. Sensor 300 may be a IMC 7555 CBAZ chip. It is understood that other types of capacitive sensors may also be used in accordance with the present invention.

Electrode 308 is coupled to the faucet body hub 310. It should be appreciated that the faucet body hub 310 itself may comprise the electrode 308. Faucet body hub 310 is also directly coupled to a manual valve handle 312, for example by metal-to-metal contact between the handle 312 and the hub 310. Illustratively, direct coupling refers to the connection of an electrode that is resistively coupled, or connected, to the input of a sensor. Manual valve handle 312 is movably coupled to the faucet body hub 310 in a conventional manner to control water flow. Since the manual valve handle 312 and the faucet body hub 310 are electrically connected, the electrode 308 may also be coupled to the manual valve handle 312, if desired. Again, electrode 308 may comprise the manual valve handle 312 itself.

Spout 314 is capacitively coupled to faucet body hub 310 by an insulator 316. Illustratively, capacitive coupling refers to an electrode's connection to the input of a sensor which is capacitive in nature due to a physical separation by some material with a defined dielectric constant. In one embodiment, such as for a kitchen faucet, the spout 314 is rotatable relative to the faucet body hub 310. In other embodiments, the spout 314 may be fixed relative to the faucet body hub 310. Spout 314 may include a pull-out or pull-down spray head 318 which is electrically isolated from the spout 314.

The faucet body hub 310 provides sufficient capacitance to earth ground for the sensor 300 to oscillate. As further discussed herein, the manual valve handle 312 is electrically connected to the faucet body hub 310. The spout 314 is capacitively coupled to the body hub 310 by insulator 316 to provide approximately a predetermined capacitance. In another embodiment (not shown), the body hub 310 is directly coupled to the spout 312. In this embodiment, the body hub 310 is capacitively coupled to the handle 312 through insulator 316.

Figure 2:
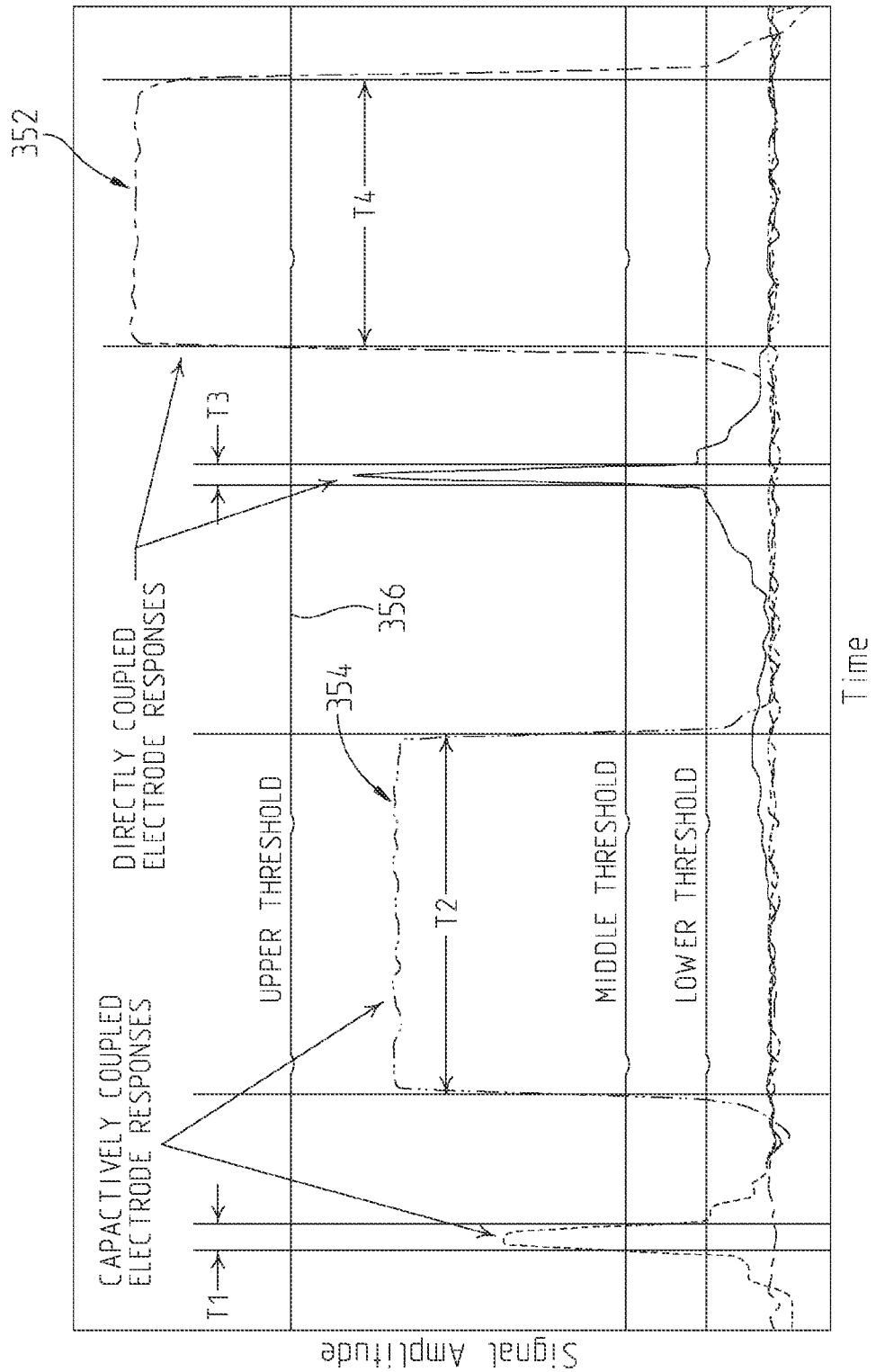
FIG. 2 is an illustrative output from the capacitive sensor of the faucet of FIG. 1.

FIG. 2 illustrates an illustrative output signal from sensor 300 which is supplied to controller 304. The controller 304 can determine whether the manual valve handle 312 is tapped (short duration) or grabbed (long duration) and whether the spout 314 is tapped (short duration) or grabbed (long duration). When the manual valve handle 312 is grasped by a user, for example at point 352 in FIG. 2, the capacitance to earth ground is directly coupled, and a larger signal is obtained. When the capacitively coupled spout 314 is grasped by a user, for example at point 354 in FIG. 2, a smaller signal is obtained. The capacitive sensor 300 therefore detects a difference when the handle 312 is touched by a user compared to when the spout 314 is touched by a user. In an illustrative embodiment, an upper threshold 356 is set above the maximum amplitude for a touch by user on the spout 314, but below the maximum amplitude of for a touch by a user on the handle 312, a determination can be made between the two.

By measuring the frequency shift compared to a baseline frequency, the controller 304 can detect where the faucet 301 is touched and how long the faucet 301 is touched to enable the controller to make water activation decisions as discussed herein. The controller 304 may use this information to control operation of the faucet 301, and more particularly of the electrically operable valve 307, in different modes. The faucet 301 may also be used with a proximity sensor (not shown), if desired, for a hands free mode.

Figure 3:
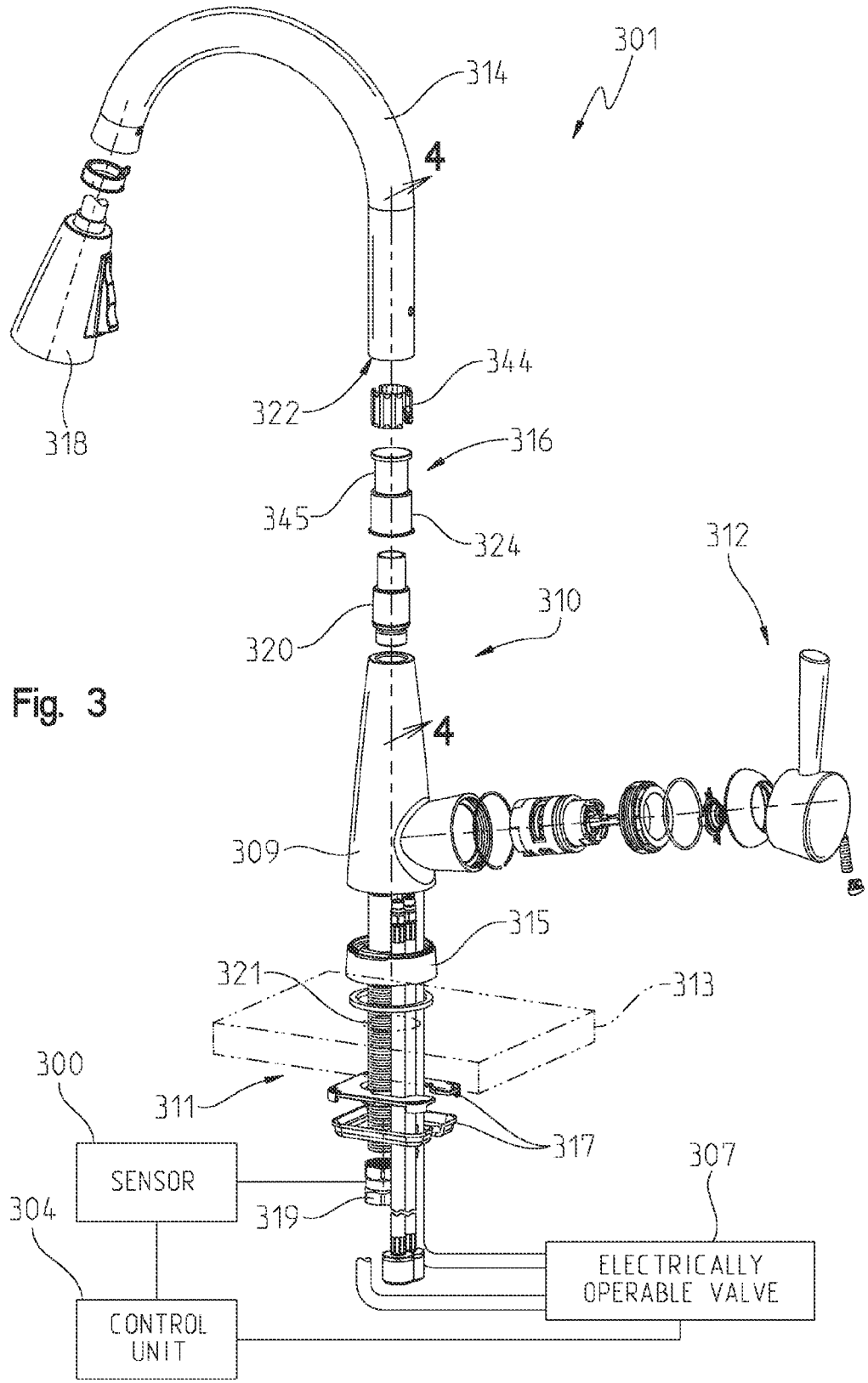
FIG. 3 is an exploded perspective view of the single hole mount faucet of FIG. 1.

FIG. 3 shows an exploded perspective view of an exemplary faucet 301. As illustrated, faucet 301 includes a faucet body hub 310 having a base 309 formed of an electrically conductive material, illustratively brass or zinc with a chrome plated finish. The hub 310 also includes an upwardly extending metallic inner member 320 formed of an electrically conductive material, illustratively brass. Metallic inner member 320 is illustratively threadably coupled to and electrically coupled to base 309. Base 309 is coupled to a sink deck 313 through a mounting assembly 311. The mounting assembly 311 includes upper and lower members 315 and 317 which clamp faucet 301 to the sink deck 313. Upper and lower members 315 and 317 illustratively electrically isolate faucet 301 from sink deck 313 by the use of electrically isolating materials, such as thermoplastics.

A nut 319 threadably engages a shank 321 coupled to base 309 to move lower member 317 toward sink deck 313. Sensor 300 is illustratively electrically coupled to nut 319 which, in turn, is electrically coupled to base 309 through shank 321. Spout 314 is formed of an electrically conductive material, and is illustratively either a mechanically formed or hydroformed brass tube with a chrome plated or PVD finished outer surface.

Figure 4A:
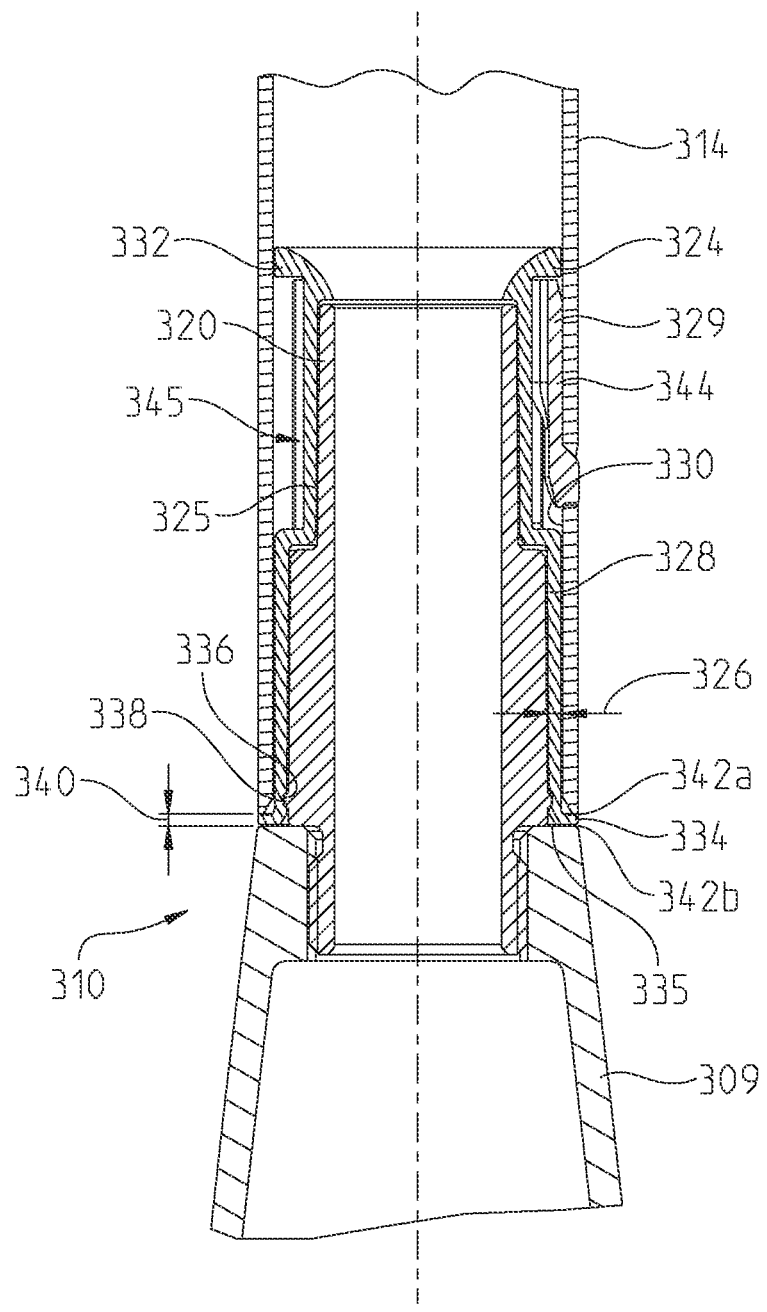
FIG. 4A is a partial cross-sectional view of the faucet of FIG. 3 taken along line 4-4.

With further reference to FIGS. 3 and 4A, metallic inner member 320 of hub 310 is electrically coupled to hub 310 and received within a lower end 322 of spout 314. Metallic inner member 320 of hub 310 is separated from spout 314 by insulator 316. Insulator 316 prevents the spout 314 from coming into electrical contact with the metallic inner member 320 of hub 310.

Insulator 316 is illustratively formed of a polymeric material. Exemplary polymeric materials include thermoplastics and thermosets. In one illustrative embodiment, insulator 316 is formed of a polyoxymethylene, also known as acetal and sold under the trade name Celcon by Ticona, a business of Celanese Corporation.

Insulator 316 illustratively comprises a substantially cylindrical sleeve 324 having a side wall 325. Upper end of sleeve 324 includes a locating ring 332, and lower end of sleeve 324 includes an insulating flange 334. Side wall 325 of sleeve 324 defines an annular space or gap 326 between an outer surface 328 of metallic inner member 320 of hub 310 and an inner surface 330 of spout 314. Side wall 325 of sleeve 324 includes an undercut or annular groove 336 which receives an annular protuberance or ridge 338 formed on outer surface of metallic inner member 320. In one illustrative embodiment, ridge 338 snaps into groove 336 to couple metallic inner member 320 to sleeve 324 and prevent vertical disassembly thereof. The coupled metallic inner member 320 and insulator 316 are then inserted into the interior of spout 316 until locating ring 332 snaps past positioning flange 329, preventing removal of insulator 316.

Insulator 316 illustratively further functions as a bushing between spout 314 and hub 310. In one embodiment, the coupled metallic inner member 320 and insulator 316 rotate within the interior of spout 314. In some embodiments, a lubricant, such as graphite or silicone, is incorporated in the polymer to reduce friction between insulator 316 and the inner surface 330 of spout 314.

With respect to FIG. 4A, flange 334 of insulator 316 prevents the lower end 322 of spout 314 from coming into electrical contact with the upper end 335 of base 309 of hub 310. Flange 334 provides a spacing or gap 340, illustratively about 0.035 inches, between the lower end 322 of spout 314 and the upper end 335 of base 309 to reduce the effect of water droplets bridging upper end of base 309 and lower end of spout 314. Upper spacing 342a, positioned between flange 334 and spout 314, and lower spacing 342b, positioned between flange 334 and base 309, create a capillary action that dissipates water droplets.

A friction spacer 344 is positioned intermediate sleeve 324 and spout 314 to prevent undesired movement or "wobbling" therebetween. Friction spacer 344 is received within an annular recess 345 of sleeve 324 and is illustratively formed of an electrically non-conductive material, such as molded thermoplastic. In one embodiment, spacer 344 is formed of Celenex PBT 2002.

Figure 4B:
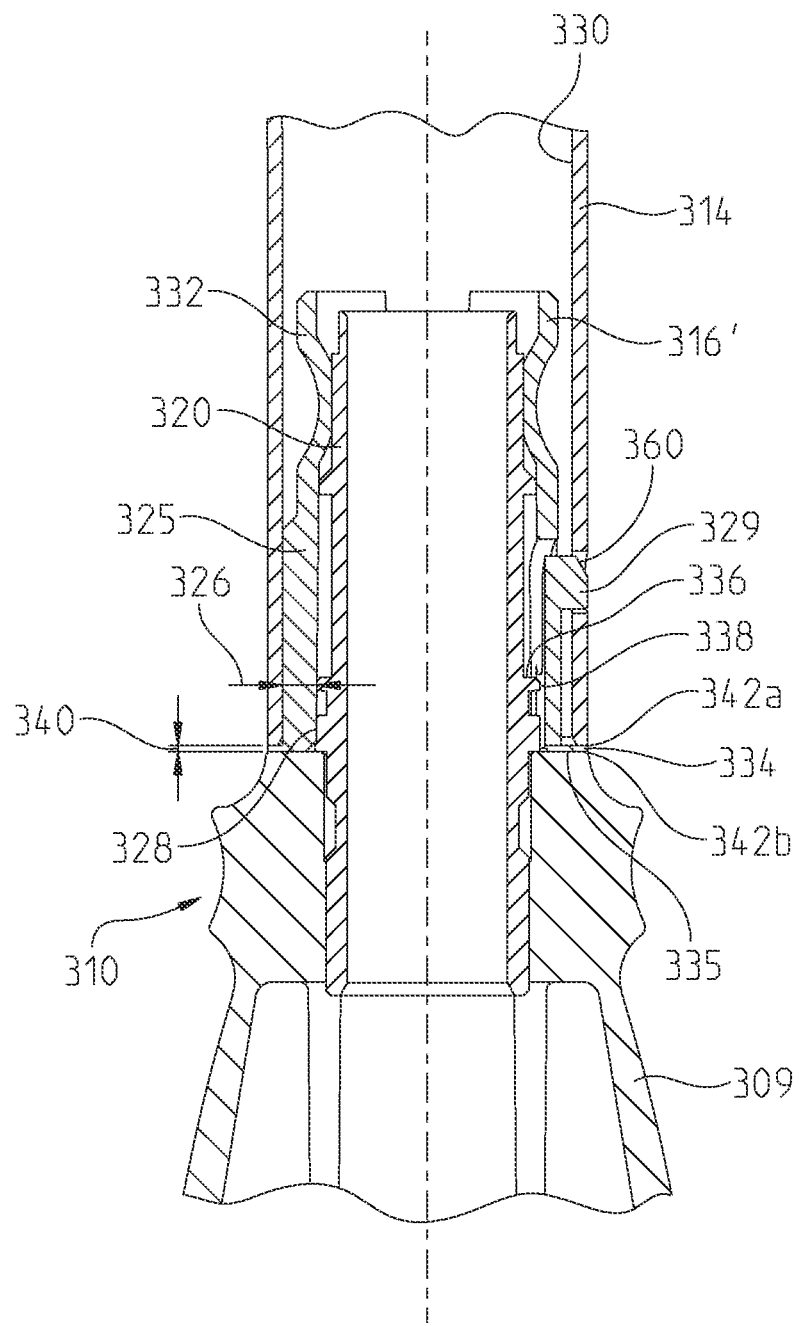
FIG. 4B is a partial cross-sectional view of a faucet including another exemplary insulator.

Referring next to FIG. 4B, another exemplary insulator 316' is illustrated. Insulator 316' is similar to insulator 316, and similar parts are indicated with the same numbers given with respect to FIGS. 3 and 4A. Insulator 316' prevents the spout 314 from coming into electrical contact with the metallic inner member 320 of hub 310. Insulator 316' also prevents undesired movement or "wobbling" between metallic inner member 320 of hub 310 and spout 314, similar to friction spacer 344, as described above. Insulator 316' is illustratively formed of a polymeric material. Exemplary polymeric materials include thermoplastics and thermosets. In one illustrative embodiment, insulator 316' is formed of a polyoxymethylene, also known as acetal and sold under the trade name Celcon or polybutylene terephthalate resin, sold under the trade name Celanex PBT by Ticona, a business of Celanese Corporation. Insulator 316' illustratively further functions as a bushing between spout 314 and hub 310. In one embodiment, the coupled metallic inner member 320 and insulator 316' rotate within the interior of spout 314. In some embodiments, a lubricant, such as graphite or silicone, is incorporated in the polymer of the insulator 316' to reduce friction between insulator 316' and the inner surface 330 of spout 314.

Insulator 316' illustratively comprises a substantially cylindrical sleeve 324 having a side wall 325. Upper end of sleeve 324 includes a locating ring 332, and lower end of sleeve 324 includes an insulating flange 334. Side wall 325 of sleeve 324 defines an annular space or gap 326 between an outer surface 328 of metallic inner member 320 of hub 310 and an inner surface 330 of spout 314. Side wall 325 of sleeve 324 includes an undercut or annular groove 336 (see FIG. 4A) which receives an annular protuberance or ridge 338 formed on outer surface of metallic inner member 320. In one illustrative embodiment, ridge 338 snaps into groove 336 to couple metallic inner member 320 to sleeve 324 and prevent vertical disassembly thereof. The coupled metallic inner member 320 and insulator 316' are then inserted into the interior of spout 314 until positioning flange 329 of insulator 316' snaps into locating hole 360 of spout 314, preventing removal of insulator 316'.

Flange 334 of insulator 316' prevents the lower end 322 of spout 314 from coming into electrical contact with the upper end 335 of base 309 of hub 310. Flange 334 provides a spacing or gap 340, illustratively about 0.035 inches, between the lower end 322 of spout 314 and the upper end 335 of base 309 to reduce the effect of water droplets bridging upper end of base 309 and lower end of spout 314. Upper spacing 342a, positioned between flange 334 and spout 314, and lower spacing 342b, positioned between flange 334 and base 309, create a capillary action that dissipates water droplets.

As detailed above, spout 314 is capacitively coupled to faucet hub 310 for the purpose of touch differentiation. The presence of the insulator 316, 316' and annular recess 345 between spout 314 and hub 310 creates a capacitive coupling therebetween. This capacitive coupling allows for differentiation between contact with spout 314 and contact with hub 310. The magnitude of this differentiation between a signal resulting from a user touching the hub 310 and a user touching the handle 312 can be adjusted to achieve a predetermined signal. In one embodiment, the signal resulting from a user touching the hub is desired to be approximately 40% of the strength of a signal resulting from a user touching the handle.

In one embodiment, conductivity of the insulator 316, 316' is configured to produce a predetermined magnitude of the differentiation between a signal resulting from a user touching the spout 314 and a user touching the handle 312. Thermoplastics and thermosets become more electrically conductive when carbon is incorporated into the polymeric material. The degree of conductivity of the insulator 316, 316' affects the signal amplitude of the output signal of capacitively coupled electrode 308. Therefore, by reducing the conductivity of the insulator 316, the signal amplitude in response to touches of the spout 314 may be reduced. Increasing the signal amplitude difference between the maximum signal output, which facilitates distinguishing between strong grabs of the manual valve handle 312 and weak grabs of the spout 314.

Figure 5:
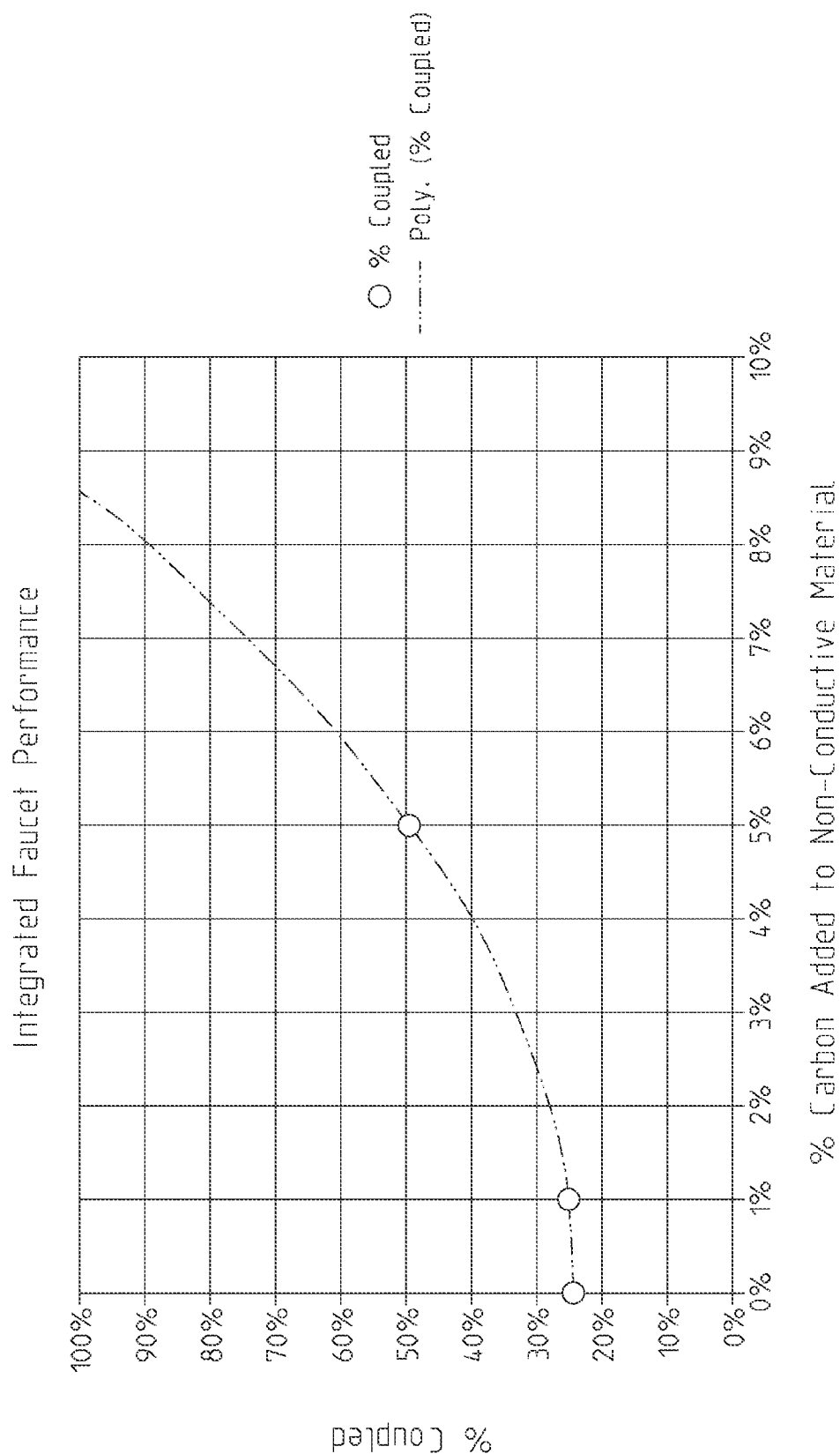
FIG. 5 is a graph showing an increase in conductivity of a plastic piece as a function of the amount of carbon in the plastic.

Several different insulators 316 comprised of polymers having different conductivity were prepared. Each polymer was a LW90S2 silicone loaded acetal for wear resistance. Levels of carbon powder from 0 wt. %, 1 wt. % and 5 wt. % based on the weight of the acetal were incorporated into each sample. An insulator 316 was molded from each compound, and the conductivity of the insulator 316 was determined. A charge was applied to the faucet body hub 310, and the charge registering at the spout 314 was measured to determine the conductivity of the insulator 316. If no charge registered, the percentage coupling was 0%. If the measured charge was the same as the applied charge, the percentage couple was 100%. As shown in FIG. 5, as the level of carbon incorporated into the polymer increased, the conductivity of the piece increased. The samples containing no carbon powder and 1 wt. % carbon powder provided about 30% coupling. At 5 wt. % carbon, 50% coupling was obtained. Samples having 10 wt. % carbon powder or greater were found to be fully coupled. FIG. 5 includes a polynomial fit of the data. Based on the results in FIG. 5, a sample having about 4 wt. % carbon powder would provide about 40% coupling.

Although carbon powder was illustratively used to increase the conductivity of the polymer, in other embodiments, carbon black, carbon fiber, carbon nanotubes, graphite metallic additives, or other suitable conductive filler material may be used.

Figure 6:
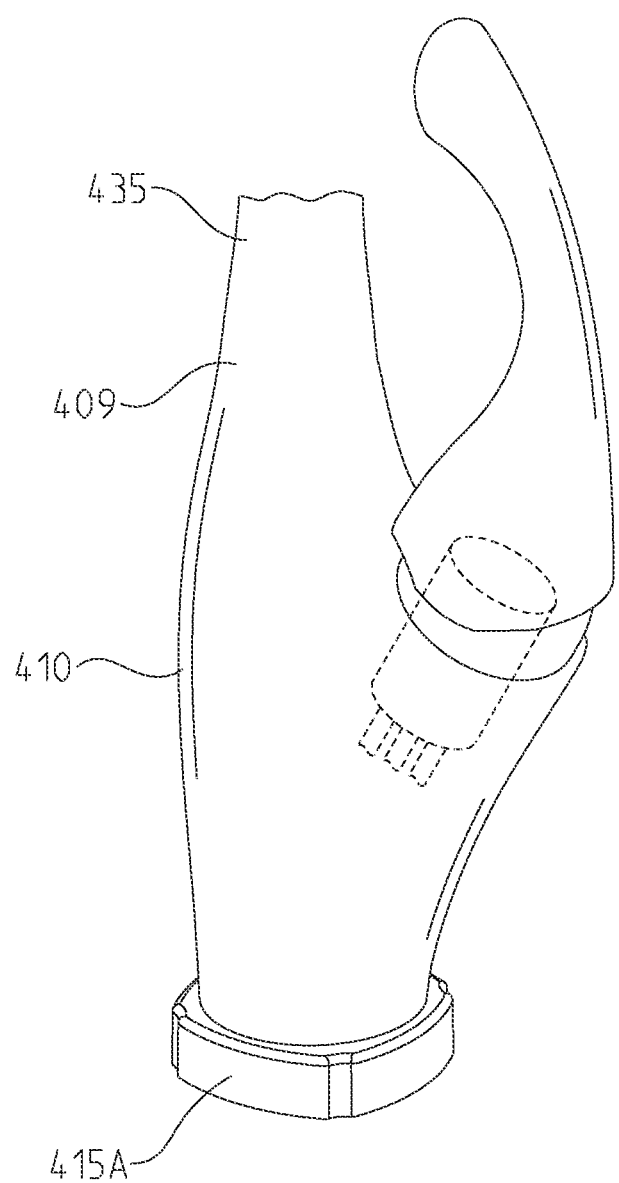
FIG. 6 is a partial perspective view of an illustrative hub formed from an electrically conductive polymer.

Referring next to FIG. 6, an exemplary polymeric faucet body hub 410. Polymeric faucet body hub 410 is similar to faucet body hub 310, except faucet body hub 410 is formed from a conductive polymeric material. Illustratively, polymeric faucet body hub was formed from a granular polyester with a graphite carbon filler available from Plastics Engineering Company. Polymeric faucet body hub 410 is illustratively attached to metal test base 415A. A charge was applied to metal test base 415A, and various positions along the hub 410 from the base 409 to the top 435 were measured. From the base 409 to the top 435, the conductivity decreased only slightly.

Figure 7:
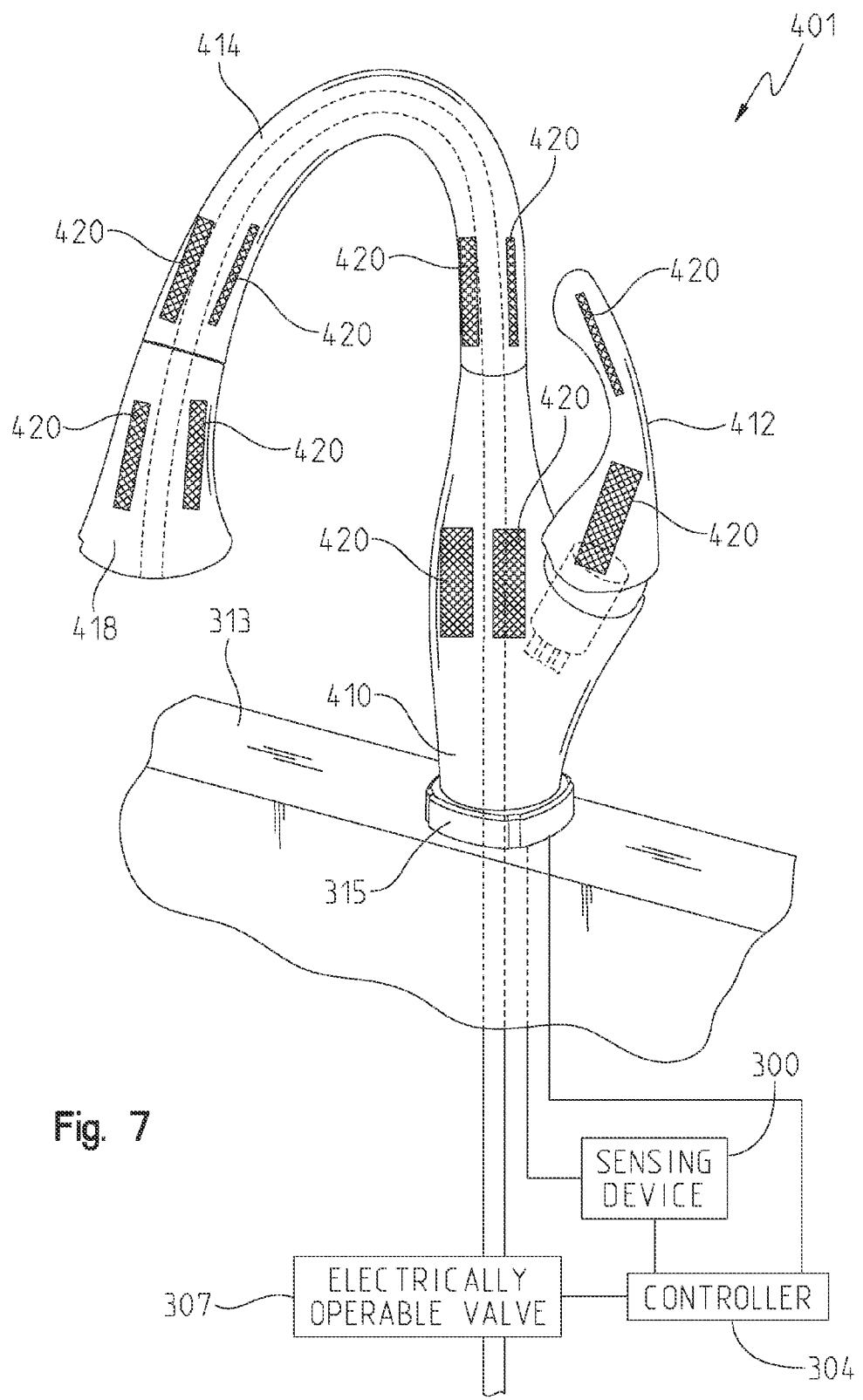
FIG. 7 is a perspective view of an illustrative polymeric faucet formed from an electrically conductive polymer containing embedded metal pieces.

Referring next to FIG. 7, an exemplary polymeric single hole mount faucet 401 is illustrated. Polymeric faucet 401 is similar to single hole mount faucet 301, but at least one of the hub 410, handle 412, spout 414, and pull-down spray head 418 is formed of a conductive polymeric material. In an illustrative embodiment, each of the hub 410, handle 412, and spout 414 is formed of a conductive polymeric material. Faucet hub 410 itself comprises an electrode that is also electrically coupled to a manual valve handle 412, for example by conductive polymer-to-conductive polymer contact between the handle 412 and the hub 410. Spout 414 is capacitively coupled to faucet body hub 410 by an insulator, as described above.

The controller 304 can determine whether the manual valve handle 412 is tapped or grabbed and whether the spout 414 is tapped or grabbed as described above. When the manual valve handle 412 is grasped by a user, for example at point 352 in FIG. 2, the capacitance to earth ground is directly coupled, and a larger signal is obtained. When the capacitively coupled spout 414 is grasped by a user, for example at point 354 in FIG. 2, a smaller signal is obtained. The capacitive sensor 300 therefore detects a difference when the handle 412 is touched by a user compared to when the spout 414 is touched by a user. In an illustrative embodiment, an upper threshold 356 is set above the maximum amplitude for a touch by user on the spout 414, but below the maximum amplitude of for a touch by a user on the handle 412, a determination can be made between the two. The controller 304 may use this information to control operation of the faucet 401, and more particularly of the electrically operable valve 307, in different modes. The faucet 401 may also be used with a proximity sensor (not shown), if desired, for a hands free mode.

As illustrated in FIG. 7, polymeric faucet 401 includes one or more metal pieces 420 within the conductive polymer comprising one or more of the hub 410, handle 412, spout 414, and pull-down spray head 418. Metal pieces 420 may serve as a contact point for the capacitive sensor. In the exemplary embodiment illustrated in FIG. 7, hub 410, handle 412, spout 414, and pull-down spray head 418 comprise a conductive polymeric overmold formed by insert molding the conductive polymer around the metal pieces 420.

In another embodiment (not shown), the metal pieces 420 is inserted into one or more of pre-formed conductive polymeric components 410, 412, 414, and 418. In still another embodiment (not shown), the embedded metal 420 is a wire or wire mesh that is inserted into one or more of pre-formed conductive polymeric components 410, 412, 414, and 418. In yet another embodiment, the conductive polymeric components 410, 412, 414, 418 comprise a polymeric overmold formed by insert molding the conductive polymer around a wire or wire mesh. In yet still another embodiment, the conductive polymeric components 410, 412, 414, 418 do not include any embedded metal.

Figure 8:
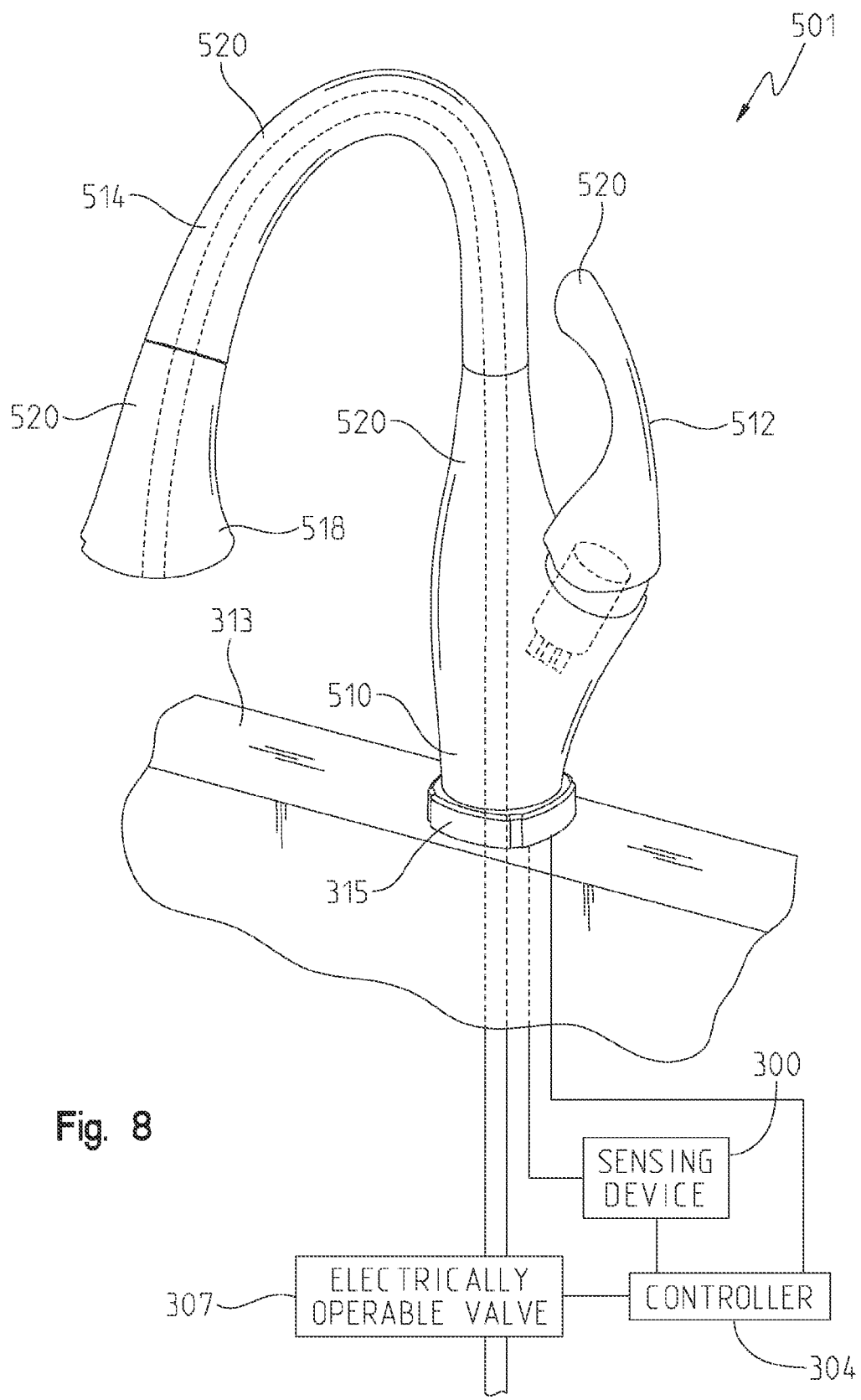
FIG. 8 is a perspective view of an illustrative polymeric faucet having an electrically conductive coating.

Referring next to FIG. 8, another exemplary polymeric single hole faucet 501 is illustrated. Polymeric faucet 501 is similar to polymeric faucet 401, but may or may not be formed from electrically conductive polymers. Illustratively, one or more of hub 510, handle 512, spout 514, and pull-down spray head 518 includes a conductive coating 520 comprising a conductive metallic paint or metallic powder. In an illustrative embodiment, each of the hub 510, handle 512, and spout 514 includes a conductive coating 520. The coating 520 of faucet hub 510 itself comprises an electrode that is also electrically coupled to the coating 520 of manual valve handle 512, for example by conductive coating to conductive coating contact between the handle 512 and the hub 510. Spout 514 is capacitively coupled to faucet body hub 510 by an insulator, as described above.

The controller 304 can determine whether the manual valve handle 512 is tapped or grabbed and whether the spout 514 is tapped or grabbed as described with respect to FIG. 2 above. When the manual valve handle 512 is grasped by a user, for example at point 352 in FIG. 2, the capacitance to earth ground is directly coupled, and a larger signal is obtained. When the capacitively coupled spout 514 is grasped by a user, for example at point 354 in FIG. 2, a smaller signal is obtained. The capacitive sensor 300 therefore detects a difference when the handle 512 is touched by a user compared to when the spout 514 is touched by a user. In an illustrative embodiment, an upper threshold 356 is set above the maximum amplitude for a touch by user on the spout 514, but below the maximum amplitude of for a touch by a user on the handle 512, a determination can be made between the two. The controller 304 may use this information to control operation of the faucet 501, and more particularly of the electrically operable valve 307, in different modes. The faucet 501 may also be used with a proximity sensor (not shown), if desired, for a hands free mode.

Figure 9:
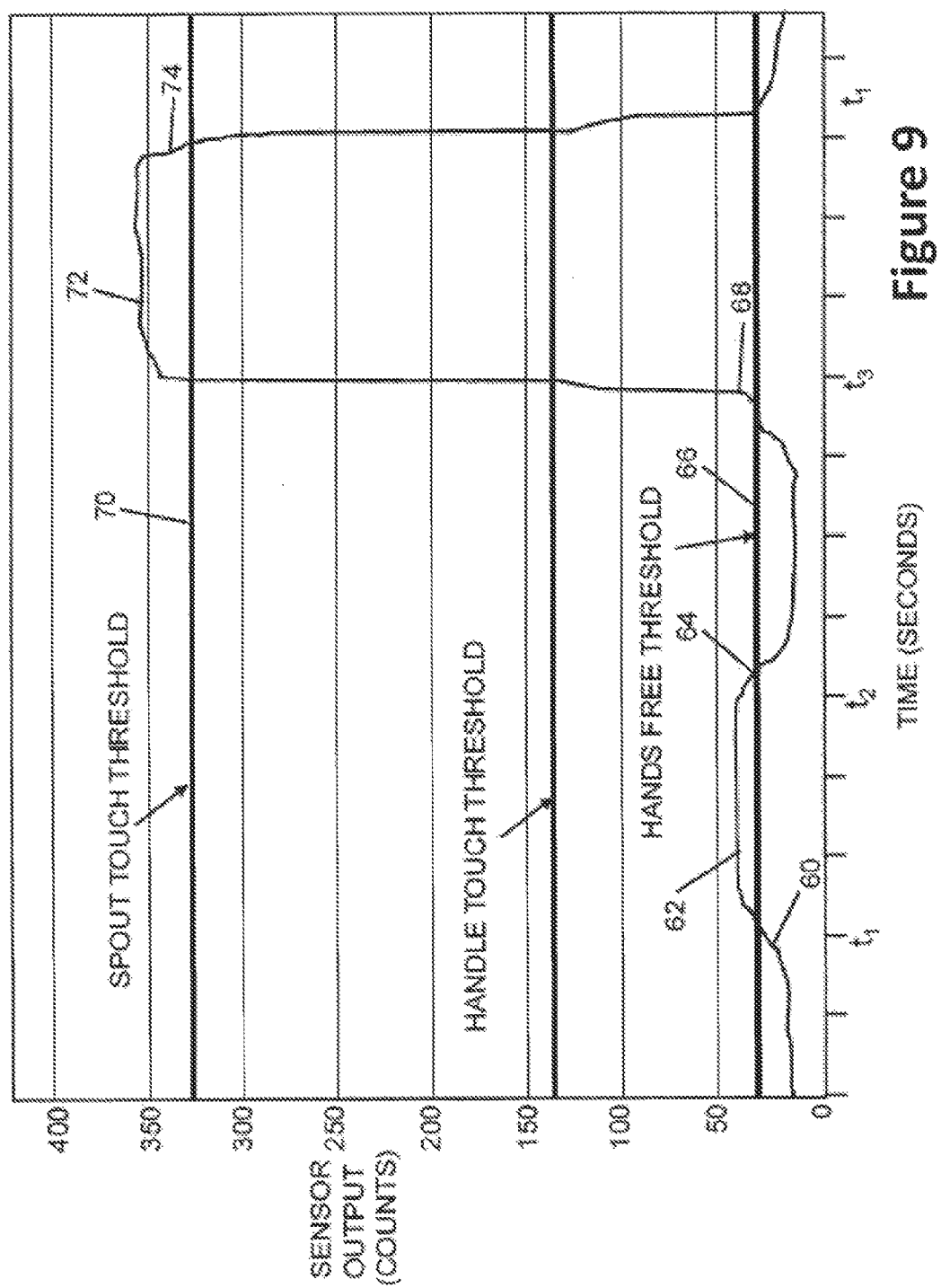
FIG. 9 is another illustrative output from a capacitive sensor of the faucet of FIG. 1.

In one exemplary embodiment, controller 304 detects output signals from one or more capacitive sensors as described above relating to both a user's hands touching the faucet, such as faucet 301, 401, or 501, or being in proximity to the faucet. FIG. 9 shows an exemplary output signal from capacitive sensor 300. Controller 304 establishes a hands free threshold level 66 and a spout touch threshold level 70 as illustrated in FIG. 9. As the user's hands enter a detection zone in the proximity of the faucet, a slope of the capacitive signal changes gradually as illustrated at location 60 in FIG. 9. Edge portion 60 of the capacitive signal illustrates the effect of the user's hands within the detection area and the negative slope of capacitive signal at location 64 illustrates the user's hands leaving the detection area. When a change in slope is detected at edge location 60 and the capacitive signal rises above the hands free threshold 66 such as during portion 62 of the signal, the controller 304 determines that the user's hands are within the detection area.

The same output signal from the capacitive sensor 300 may also be used to determine whether the spout or a handle is touched, as described with respect to FIG. 2 above. When the electrode 308 is coupled to the spout 314 and the spout 314 is touched, a large positive slope is generated in the capacitive signal as illustrated at location 68. The capacitive signal count level exceeds the touch threshold 70 during the time of the touch which is shown by portion 72 of the capacitive signal. Controller 300 may then detect a negative slope at location 74 indicating that the touch has ended. The controller 300 may distinguish between a "tap" and a "grab" of the spout 12 based on the amount of time between the positive and negative slopes of the capacitive signal.

Referring to FIG. 9, in an illustrated embodiment, hands free threshold 66 for proximity detection is set at about 30-40 counts. The spout touch detection threshold 70 is illustratively set at about 300-400 counts. In other words, the amplitude of the capacitive signal from capacitive sensor 300 for the spout touch threshold 70 is about 10 times greater than the amplitude for the hands free threshold 66.

If the capacitive sensor 26 and electrode 25 are also used to detect touching of the handle 14, another threshold level is provided for the handle touch. For example, the handle touch threshold may be set at a shown in FIG. 9 intermediate the hands free threshold 66 and spout touch threshold 70. The handle touch threshold is illustratively set at about 130-150 counts. The count values described herein are for illustrative purposes only and may vary depending upon the application. Illustratively, the handle touch threshold is about 35-45% of the spout touch threshold 70, and the hands free threshold 66 is about 5-10% of the spout touch threshold 70.

In one embodiment, the user may select to disable the proximity mode of operation and only use the touch mode. In some embodiments, the capacitive sensor 300 is connected to the faucet 301 with a single wire to provide an inexpensive way to provide both touch and proximity sensing without adding a second sensor to the faucet.

The embodiments of the invention described herein are not intended to be exhaustive or to limit the invention to precise forms disclosed. Rather, the embodiments selected for description have been chosen to enable one skilled in the art to practice the invention.

Although the invention has been described in detail with reference to certain preferred embodiments, variations and modifications exist within the spirit and scope of the invention as described and defined in the following claims.

The invention claimed is:

1. A faucet comprising:
   a faucet body hub;
   a spout coupled to the faucet body hub;
   an insulator defining a capacitive coupling between the faucet body hub and the spout, wherein the insulator is formed from an electrically conductive polymer;
   a capacitive sensor having an electrode coupled to the faucet body hub; and
   a controller coupled to the capacitive sensor, an output signal from the capacitive sensor being supplied to the controller.

2. The faucet of claim 1, wherein the controller determines if the spout is touched by a user based on the output signal from the capacitive sensor.

3. The faucet of claim 1, wherein the insulator allows rotation of the spout about the faucet body hub.

4. The faucet of claim 1, wherein the electrically conductive polymer comprises a polymer and an electrically conductive filler.

5. The faucet of claim 4, wherein the polymer is polyoxymethylene.

6. The faucet of claim 4, wherein the electrically conductive filler is selected from the group consisting of carbon powder, carbon black, carbon fiber, carbon nanotubes, graphite, and metallic additives.

7. The faucet of claim 4, wherein the polymer further comprises a lubricant.

8. The faucet of claim 1, further comprising:
   a manual valve handle movably coupled to the faucet body hub to control a manual valve, the manual valve handle being electrically coupled to the faucet body hub;
   wherein the controller further determines if the manual valve handle is touched by a user based on the output signal from the capacitive sensor.

9. The faucet of claim 8, wherein the controller uses the output signal from the capacitive sensor to distinguish between when the manual valve handle is tapped by the user, when the manual valve handle is grabbed by the user, when the spout is tapped by the user, and when the spout is grabbed by the user to control operation of the faucet in different modes.

10. The faucet of claim 8, wherein the faucet comprises a single hole mount faucet.

11. The faucet of claim 8, wherein a first output signal change is detected by the controller when the manual valve handle is touched by the user, and a second output signal change is detected by the controller when the spout is touched by the user, the first output signal change being greater than the second output signal change.

12. The faucet of claim 11, wherein a magnitude of the second output signal change is about 40% of a magnitude of the first output signal change.

13. A faucet comprising:
   a faucet body hub;
   a manual valve supported by the hub, the valve including a movable valve stem;
   a manual valve handle movably supported by the hub and operably coupled to the valve stem to control the manual valve, the manual valve handle including a user input member;
   a spout supported by the hub; and
   a capacitive coupling defined by an insulator positioned intermediate the hub and one of the spout and the handle, wherein the insulator is formed from an electrically conductive polymer.

14. The faucet of claim 13, further comprising:
   a capacitive sensor coupled to the hub; and
   a controller operably coupled to the capacitive sensor, the controller determining which of the user input member of the manual valve handle and the spout is touched by a user based on an output signal from the capacitive sensor.

15. The faucet of claim 13, wherein the hub includes a base and an upwardly extending inner member concentrically received within the spout, and the insulator includes a side wall positioned intermediate the inner member and the spout.

16. The faucet of claim 13, wherein the capacitive coupling is defined by the insulator positioned intermediate the hub and the user input member of the handle.

17. The faucet of claim 16, wherein the insulator allows rotation of the spout about the faucet body hub.

18. The faucet of claim 13, wherein the electrically conductive polymer comprises a polymer and an electrically conductive filler.

19. The faucet of claim 18, wherein the polymer is polyoxymethylene.

20. The faucet of claim 18, wherein the electrically conductive filler is selected from the group consisting of carbon powder, carbon black, carbon fiber, carbon nanotubes, graphite, and metallic additives.

21. The faucet of claim 18, wherein the electrically conductive filler is a carbon powder.

22. The faucet of claim 18, wherein the polymer further comprises a lubricant.

23. The faucet of claim 14, wherein the controller uses the output signal from the capacitive sensor to distinguish between when the user input member of the handle is tapped by the user, when the user input member of the handle is grabbed by the user, when the spout is tapped by the user, and when the spout is grabbed by the user to control operation of the faucet in different modes.

24. The faucet of claim 13, wherein the faucet comprises a single hole mount faucet.

25. The faucet of claim 14, wherein a first output signal change is detected by the controller when the user input member of the handle is touched by the user, and a second output signal change is detected by the controller when the spout is touched by the user, the first output signal change being greater than the second output signal change.

26. The faucet of claim 25, wherein a magnitude of the second output signal change is about 40% of a magnitude of the first output signal change.

27. The faucet of claim 13, wherein the faucet body hub and at least one of the manual valve handle and the spout is formed of an electrically conductive polymer.

28. The faucet of claim 13, wherein the faucet body hub and at least one of the manual valve handle and the spout further includes an electrically conductive coating.

29. The faucet of claim 28, wherein the capacitive coupling includes the electrically conductive coating of the faucet body hub and the electrically conductive coating of the at least one of the manual valve handle and the spout.

30. The faucet of claim 28, wherein the electrically conductive coating includes a metallic powder.

* * * * *